(12) United States Patent
Akenine-Moller et al.

(10) Patent No.: US 9,460,552 B2
(45) Date of Patent: Oct. 4, 2016

(54) METHOD, DISPLAY ADAPTER AND COMPUTER PROGRAM PRODUCT FOR IMPROVED GRAPHICS PERFORMANCE BY USING A REPLACEABLE CULLING PROGRAM

(75) Inventors: Tomas Akenine-Moller, Lund (SE); Jon Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 12/523,894

(22) PCT Filed: Jan. 23, 2008

(86) PCT No.: PCT/SE2008/000055
§ 371 (c)(1),
(2), (4) Date: Mar. 11, 2010

(87) PCT Pub. No.: WO2008/091198
PCT Pub. Date: Jul. 31, 2008

(65) Prior Publication Data
US 2010/0182314 A1     Jul. 22, 2010

Related U.S. Application Data

(60) Provisional application No. 60/900,084, filed on Feb. 8, 2007.

(30) Foreign Application Priority Data

Jan. 24, 2007   (SE) ...................................... 0700162

(51) Int. Cl.
*G06T 15/40*     (2011.01)
*G06T 15/00*     (2011.01)

(52) U.S. Cl.
CPC ............. *G06T 15/40* (2013.01); *G06T 15/005* (2013.01)

(58) Field of Classification Search
None
See application file for complete search history.

(56) References Cited

U.S. PATENT DOCUMENTS

| 5,600,763 A | 2/1997 | Greene et al. |
| 6,166,748 A | 12/2000 | Van Hook et al. |
| 6,636,212 B1 * | 10/2003 | Zhu ............................... 345/421 |

(Continued)

FOREIGN PATENT DOCUMENTS

| CN | 101681526 | 3/2013 |
| WO | 2004047008 | 6/2004 |

OTHER PUBLICATIONS

Hasselgren, Jon, and Thomas Akenine-Möller. "PCU: the programmable culling unit.", Jul. 2007, ACM Transactions on Graphics, vol. 26, No. 3, Article 92.*

(Continued)

*Primary Examiner* — Robert Bader
(74) *Attorney, Agent, or Firm* — Trop Pruner & Hu, P.C.

(57) ABSTRACT

It is presented a method for improving performance of generation of digitally represented graphics. Said method comprises the steps of: selecting (440) a tile comprising fragments to process; executing (452) a culling program for the tile, the culling program being replaceable; and executing a set of instructions, selected from a plurality of sets of instructions based on an output value of the culling program, for each of a plurality of subsets of the fragments. A corresponding display adapter and computer program product are also presented.

21 Claims, 7 Drawing Sheets

(56) References Cited

U.S. PATENT DOCUMENTS

| | | | |
|---|---|---|---|
| 7,068,272 B1* | 6/2006 | Voorhies et al. | 345/422 |
| 2004/0130552 A1 | 7/2004 | Duluk | |
| 2004/0207622 A1* | 10/2004 | Deering | G06T 15/50 345/426 |

OTHER PUBLICATIONS

Ned Greene, Michael Kass, Gavin Miller, "Hierarchical Z-Buffer Visibility", 1993, ACM, SIGGRAPH '93, Proceedings of the $20^{th}$ Annual Conference on Computer Graphics and Interactive Techniques, pp. 231-238.*

Timo Aila, Tomas Akenine-Möller, "A Hierarchical Shadow Volume Algorithm", Aug. 30, 2004, ACM, HWWS '04 Proceedings of the ACM SIGGRAPH/EUROGRAPHICS conference on Graphics Hardware, pp. 15-23.*

Solomon Boulos, Ingo Wald, Peter Shirley, "Geometric and Arithmetic Culling Methods for Entire Ray Packets", 2006, School of Computing, University of Utah, Technical Report No. UUCS-06-10.*

Kavita Bala, Bruce Walter, and Donald Greenberg, "Combining Edges and Points for Interactive Anti-Aliased Rendering", Jan. 2002, Technical Report, Cornell University, Program of Computer Graphics, PGC-02-3.*

Luiz Velho, "Mathematical Optimization in Graphics and Vision", Jul. 29, 2003, Course Notes—SIGGRAPH 2003, chapter 7.*

Wolfgang Heidrich, Philipp Slusallek, and Hans-Peter Seidel, "Sampling Procedural Shaders Using Affine Arithmetic", Jul. 1998, ACM, Journal of ACM Transactions on Graphics, vol. 17, Issue 3, pp. 158-176.*

Fred D. Crary, "A Versatile Precompiler for Nonstandard Arithmetics", Jun. 1979, ACM, ACM transactions on Mathematical Software, vol. 5, No. 2, pp. 204-217.*

Herve Bronnimann, Guillame Melquiond, Sylvain Pion, "The design of the Boost interval arithmetic library", 2006, Elsevier, Journal of Theoretical COmputer Science, Real Numbers and Computers, 351 (1), pp. 111-118.*

Affonso De Cusatis Junior, Luiz Henrique De Figuieredo, Marcelo Gattass, "Interval methods for ray casting implicit surfaces with affine arithmetic", Oct. 20, 1999, IEEE Proceedings XII Brazilian Symposium on Computer Graphics and Image Processing, 1999, pp. 65-71.*

PCT International Search Report and Written Opinion issued in corresponding PCT/SE2008/000055 dated Jan. 22, 2009 (12 pages).

Supplementary European Search Report issued in corresponding 08705228.8-1502/2122577 dated Feb. 13, 2015 (3 pages).

Heidrich, W., et al., "Sampling Procedural Shaders using Affine Arithmetic," ACM Transactions on Graphics (TOG), ACM, U.S., vol. 17, No. 3, Jul. 1, 1998 (20 pages).

* cited by examiner

METHOD, DISPLAY ADAPTER AND COMPUTER PROGRAM PRODUCT FOR IMPROVED GRAPHICS PERFORMANCE BY USING A REPLACEABLE CULLING PROGRAM

CROSS REFERENCE TO RELATED APPLICATION

This application is a non-provisional application claiming priority to provisional application Ser. No. 60/900,084 filed Feb. 8, 2007, and PCT/SE2008/000055 filed Jan. 23, 2008 hereby expressly incorporated by reference herein.

FIELD OF THE INVENTION

The present invention generally relates to digitally represented graphics and more particularly to improving the performance of generating digitally represented graphics.

BACKGROUND OF THE INVENTION

Digitally represented graphics, such as computer graphics, is continuously improving in performance.

In the 1980's and 1990's, display adapters for computers and game consoles appeared with graphics accelerators, offloading the Central Processing Unit (CPU) in graphics generation. Initially, the display adapters offered acceleration of 2D graphics, but eventually these also included support for accelerated 3D graphics. Modern display adapters use a processing unit often named a graphics processing unit (GPU).

Due to the complexity of 3D graphics, GPU:s of today use a significant amount of their processing power to perform calculations related to 3D graphics.

A continuous problem with display adapters is performance. There are always new applications and games requiring higher frame rates (rendered screen images per second), higher resolutions and higher image quality, resulting in requirements that each screen image should be rendered in a short a time as possible. In other words, it is always important to increase performance.

One way known to increase performance is to increase the processing power of the GPU:s by enabling higher clock speeds, pipelining, or exploiting parallel computations. However, this often generates more heat, resulting in more power consumption and higher fan noise for cooling the GPU. Moreover, there are limits to the clock speeds of each GPU.

Consequently, there is still a problem with insufficient abilities to improve performance in digitally represented graphics.

SUMMARY OF THE INVENTION

In view of the above, an objective of the invention is to solve or at least reduce the problems discussed above.

Generally, the above objectives are achieved by the attached independent patent claims.

According to a first aspect of the invention there has been provided a method for improving performance of generation of digitally represented graphics, comprising the steps of: selecting a tile comprising fragments to process; executing a culling program for the tile, the culling program being replaceable; and executing a set of instructions, selected from a plurality of sets of instructions based on an output value of the culling program, for each of a plurality of subsets of the fragments. It is therefore possible to create culling programs processing the tile, and let these be executed to improve the performance.

In the step of executing a culling program for said tile, arithmetic representing a whole tile may be used for at least part of instructions of the culling program. This allows processing of a plurality of fragments at a time which improves the performance.

In the step of executing a culling program, interval arithmetic may be used for at least part of instructions of the culling program. Interval arithmetic allows representation of a plurality of fragments and can be implemented relatively easily.

In the step of executing a culling program, affine arithmetic may be used for at least part of instructions of the culling program. Affine arithmetic allow a relatively accurate representation of a plurality of fragments.

The method may further comprise the step of: providing values representing at least one attribute of a plurality of fragments of the fragments to the culling program.

Each of the subsets of fragments of the tile may comprise one fragment. In other words, processing is performed for each fragment.

The step of executing a set of instructions may involve, when the output value satisfies a culling condition, executing a first set of instructions for each of a plurality of subsets of the fragments, and when the output value fails the culling condition, executing a second set of instructions for each of the plurality of subsets of fragments.

The first set of instructions may comprise fewer instructions than the second set of instructions.

The first set of instructions may comprise zero instructions. In other words, if the culling condition is true, no instructions are processed, resulting in improved performance.

In the step of executing a set of instructions, the culling condition may correspond to the fragments of the tile making no contribution to a finally rendered image. This is a source of performance improvement in the invention.

In the step of executing a set of instructions, the culling condition may correspond to the fragments of the tile making a contribution less than a threshold value to a finally rendered image. This will improve performance even further, with a tradeoff of reduced image quality. The threshold can be configured arbitrarily according to a desired balance of performance and image quality.

In the step of providing values, the values may be calculated using interval arithmetic, using a plurality of fragments of the tile as input.

In the step of providing values, the values may be calculated using affine arithmetic, using a plurality of fragments of the tile as input.

In the step of providing values, the values may be calculated as a result of the culling program requesting access to the values. In other words, a pull mechanism is used to provide values to the culling program.

In the step of providing values, the values may be calculated prior to executing the culling program. In other words, a push mechanism is used to provide values to the culling program.

The step of selecting a tile comprising fragments to process may involve selecting a tile which is at least partly overlapped by a polygon being processed. In other words, a tile with potential contribution from the polygon is selected.

The fragments may be fragments associated with the polygon. Consequently, only fragments of the polygon in the tile are processed.

The steps of selecting a tile, executing a culling program, and executing a set of instructions are repeated until all tiles which are at least partly overlapped by the specified polygon have been processed. When a polygon has been processed, the next polygon may be processed similarly, and so forth until all polygons of an image have been processed.

In the step of executing a set of instructions, at least one of values calculated by said culling program may be used in said selected set of instructions or in processing by subsequently used processing units. These valued may for example be used in a hierarchical depth culling performed at a later stage.

A second aspect of the invention is a display adapter adapted to generate digitally represented graphics comprising: means for selecting a tile comprising fragments to process; means for executing a culling program for the tile, the culling program being replaceable; and means for executing a set of instructions, selected from a plurality of sets of instructions based on an output value of the culling program, for each of a plurality of subsets of the fragments. It is to be noted that the second aspect of the invention can be embodied with any combination of features corresponding to any the features of the first aspect of the invention.

A third aspect of the invention is a computer program product comprising software instructions that, when executed in a controller, performs the method according to the first aspect of the invention.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTIONS OF THE DRAWINGS

Embodiments of the present invention will now be described in more detail, reference being made to the enclosed drawings, in which:

FIG. 6b is a graph illustrating input values in the case of FIG. 6a.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
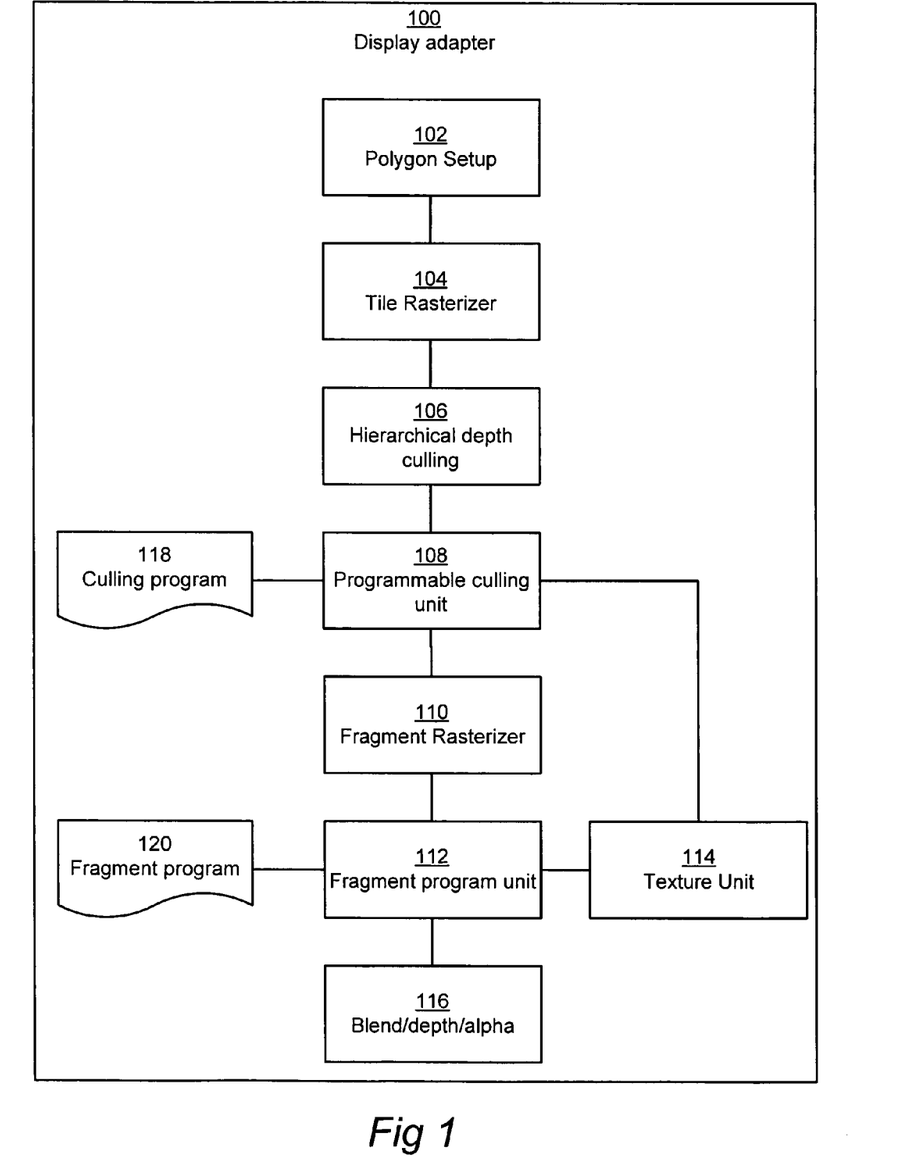
FIG. 1 is a block diagram illustrating how different entities interact in a display adapter in an embodiment of the present invention.

FIG. 1 is a block diagram illustrating how different entities interact in a display adapter 100 in an embodiment of the present invention.

Figure 5:
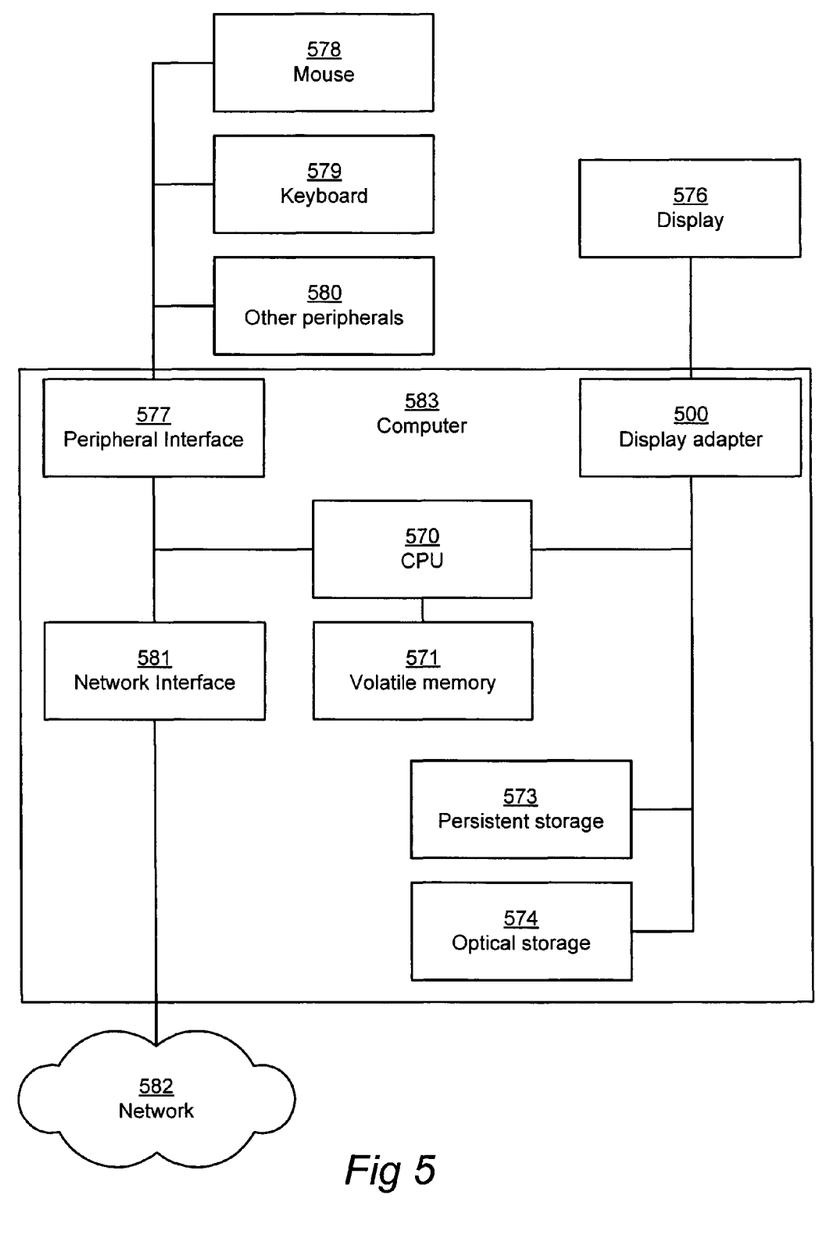
FIG. 5 shows an overview architecture of a typical general purpose computer embodying the display adapter of FIG. 1.

The polygon setup block 102 is responsible for setting up polygons as instructed by a connected CPU 570 (FIG. 5). Although any polygon can be used, triangles are commonly used. For each polygon, a tile rasterizer 104 divides the polygon to be rendered into one or more tiles, where each tile is at least partly overlapped by the polygon. In general, a tile is a group of fragments. In one embodiment, a tile is a two-dimensional rectangle containing a number of fragments. Each of these fragments correspond to a pixel and contain all data required to render the pixel and to test whether the pixel should be rendered on the screen. A common size of a tile is 8 by 8 fragments, although any tile size is within the scope of the invention.

A hierarchical depth culling block 106 performs hierarchical depth culling, which is culling based on depth buffering. Here, a conservative test is performed to prove whether that tile is covered by the contents in the depth buffer. In other words, it is tested if there is another rendered object fully covering polygon in the tile, from the viewers perspective. If that is the case, the entire tile can be culled, i.e. singled out for less processing, e.g. skipped. This then results in performance gains. It is to be noted that the hierarchical depth culling may be performed either before or after the culling of a programmable culling unit 108. This unit is fixed function, which means that it does not execute a replaceable program.

In the programmable culling unit 108, culling is performed according to a replaceable culling program 118, also known as a replaceable culling module. The details of this culling program 118 and the effects are explained in more detail in conjunction with FIG. 4a below.

In a fragment rasterizer 110, the tile processed by the programmable culling unit 108 is broken down into fragments, overlapping the polygon. Each of these fragments correspond to a pixel and contain data required to render the pixel and to test whether the pixel should be rendered on the screen. The fragment data includes raster position, depth, color, texture coordinates, stencil, alpha (used for blending), etc. For every pixel there may exist a plurality of fragment samples.

In the fragment program unit 112, the fragments output from the fragment rasterizer are processed using a fragment program 120. The purpose of this unit is to perform tasks such as combining previously evaluated color with textures, as well as to add effects such as fog, as well as to, when possible, identify fragments that do not need to be rendered, i.e. fragment culling.

A texture unit 114 is used for texture lookups, for example using one-dimensional, two-dimensional, three-dimensional, four-dimensional and cube map textures, and provides these to the programmable culling unit 108 and the fragment program unit 112 as required.

The blend/depth/alpha unit 116 uses the fragments provided from the fragment program unit 112 to perform depth testing, alpha testing, and blending before the fragments are written to target buffers.

Figure 2:
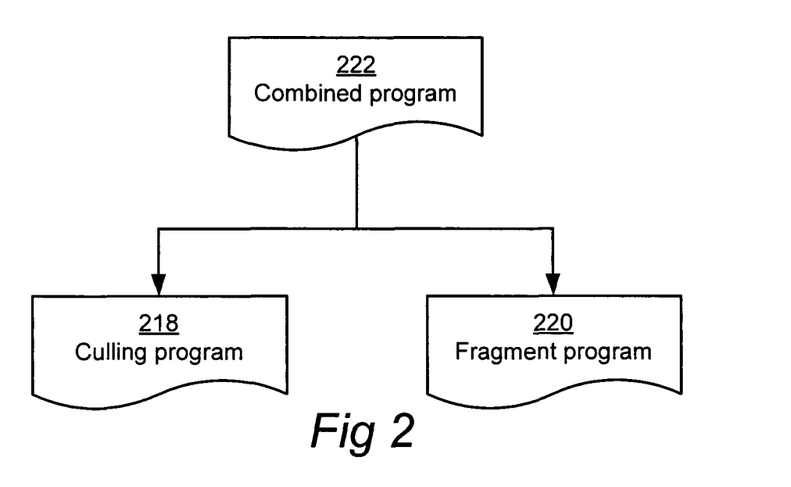
FIG. 2 is a schematic block diagram showing the relationships between different programs used in the display adapter of FIG. 1

FIG. 2 is a schematic block diagram showing the relationships between different programs used in the display adapter 100 of FIG. 1.

The principle is that a combined program 222 can be used to automatically generate a culling program 218 for use in the programmable culling unit 108 and a fragment program 220 for use in the fragment program unit 112. Optionally, a programmer can write individual culling and fragment programs 218, 220.

As an example, consider the pseudo code segment (1) of a combined program 222, originally written for use as a fragment program:

DP3 $d,n,l$

KIL $d<0$

TEX2D $c,t0,r1$

MUL out.col,$d,c$ (1)

This program performs basic diffuse lighting by computing the dot product between the light (l) and normal (n) vectors into a result (d) using the DP3 instruction. The n and l vectors varies per fragment. The KIL instruction terminates all fragments where the surface normal does not face the light, indicated by d being less than 0. The TEX2D instruction performs a lookup of a two dimensional texture into c. Finally, the result (d) is multiplied by a diffuse material coefficient (c).

In the novel manner proposed herein, the KIL instruction is an opportunity for culling a whole tile of fragments. But in order to do so, it should be conservatively proven that the condition for the KIL instruction is fulfilled for the whole tile. From this follows that, in this example, it must also be possible to conservatively evaluate the DP3 instruction, since the KIL instruction depends on the result of that instruction. Furthermore, it must be possible to find conservative bounds of the input (the vectors for the normal n and light l in this case) for a whole tile, since the DP3 instruction in turn depends on these values.

In order to implement this chain of conservative evaluations, the programmable culling unit is based on the same instruction set as the fragment program unit. However, instead of floating-point variables as source and destination registers to an instruction, as is typical when processing fragments, intervals are used and the instruction is implemented using principles of interval arithmetic. As a simple example, consider a standard ADD instruction:

ADD $c,a,b \Leftrightarrow c=a+b$ (2)

For the corresponding programmable culling unit interval instruction, the operands are replaced by intervals, â, b̂, ĉ, where an interval, e.g. â, is defined as:

$â=[\underline{a},\overline{a}]=\{x|\underline{a} \leq x \leq \overline{a}\}$ (3)

The programmable culling unit ADD instruction is then:

ADD $ĉ,â,b̂ \Leftrightarrow ĉ=â+b̂$ (4)

where the interval addition operation is implemented as:

$â+b̂==[\underline{a},\overline{a}]+[\underline{b},\overline{b}]=[\underline{a}+\underline{b},\overline{a}+\overline{b}]$ (5)

As can be seen, the result of the interval addition contains all possible results of "normal" additions, or more formally, it holds that a+b∈â+b̂ given that a∈â and b∈b̂. It is therefore conservatively correct. In similar fashion, the behavior of every instruction in the fragment program instruction set is redefined. Full details of the resulting enhanced instructions are presented here.

TABLE 1

Arithmetic and conditional expressions of instructions in embodiment

| Instruction | Operation | Condition |
|---|---|---|
| MOV dst, src | dst ← src | |
| MAD dst, s1, s2, s3 | dst ← [min($\underline{s1} \cdot \underline{s2}, \overline{s1} \cdot \underline{s2}, \underline{s1} \cdot \overline{s2}, \overline{s1} \cdot \overline{s2}$) + $\underline{s3}$, max($\underline{s1} \cdot \underline{s2}, \overline{s1} \cdot \underline{s2}, \underline{s1} \cdot \overline{s2}, \overline{s1} \cdot \overline{s2}$) + $\overline{s3}$] | |
| DP4 dst, s1, s2 | dst ← [$\Sigma_{x,y,z,w}$ min($\underline{s1} \cdot \underline{s2}, \overline{s1} \cdot \underline{s2}, \underline{s1} \cdot \overline{s2}, \overline{s1} \cdot \overline{s2}$), $\Sigma_{x,y,z,w}$ max($\underline{s1} \cdot \underline{s2}, \overline{s1} \cdot \underline{s2}, \underline{s1} \cdot \overline{s2}, \overline{s1} \cdot \overline{s2}$)] | |
| RCP dst, src | dst ← [1/$\overline{src}$, 1/$\underline{src}$] | 0 ∉ src |
| | dst ← (−∞, ∞) | 0 ∈ src |
| RSQ dst, src | dst ← [1/$\sqrt{\overline{src}}$, 1/$\sqrt{\underline{src}}$] | $\underline{src} > 0$ |
| | dst ← [NaN, NaN] | $\overline{src} \leq 0$ |
| EX2 dst, src | dst ← [$2^{\underline{src}}, 2^{\overline{src}}$] | |
| LG2 dst, src | dst ← [log$_2\underline{src}$, log$_2\overline{src}$] | $\underline{src} > 0$ |
| | dst ← [NaN, NaN] | $\overline{src} \leq 0$ |
| MAX dst, s1, s2 | dst ← [max($\underline{s1}, \underline{s2}$), max($\overline{s1}, \overline{s2}$)] | |
| MIN dst, s1, s2 | dst ← [min($\underline{s1}, \underline{s2}$), min($\overline{s1}, \overline{s2}$)] | |
| SGE dst, s1, s2 | dst ← 0 | $\overline{s1} < \underline{s2}$ |
| | dst ← 1 | $\underline{s1} \geq \overline{s2}$ |
| | dst ← [0, 1] | otherwise |
| SLT dst, s1, s2 | dst ← 0 | $\underline{s1} \geq \overline{s2}$ |
| | dst ← 1 | $\overline{s1} < \underline{s2}$ |
| | dst ← [0, 1] | otherwise |
| FLR dst, src | dst ← [⌊$\underline{src}$⌋, ⌊$\overline{src}$⌋] | |
| NEG dst, src | dst ← −[$\overline{src}, \underline{src}$] | |
| SAT dst, src | dst ← [max(0, min(1, $\underline{src}$)), max(0, min(1, $\overline{src}$))] | |

In addition to using interval instructions, the input must also be defined as intervals. Therefore, it must be possible to compute conservative bounds for quantities interpolated over an entire tile of fragments. This is explained in more detail below. It is to be noted that although interval arithmetic is used herein, any suitable arithmetic representing the whole tile can be used. For example, affine arithmetic can equally well be used within the scope of the present invention.

With the reasoning above, the culling program 218 can in this situation automatically be derived from the combined program (1). Here follows the derived culling program:

$$\text{DP1 } \hat{d}, \hat{n}, \hat{l}$$

$$\text{KIL } \hat{d} < 0 \qquad (6)$$

Furthermore, here the fragment program 220 is derived from the combined program (1), to be identical to the combined program 220. Here follows the fragment program:

$$\text{DP3 } d, n, l$$

$$\text{KIL } d < 0$$

$$\text{TEX2D } c, t0, r1$$

$$\text{MUL out.col}, d, c \qquad (7)$$

Figure 3:
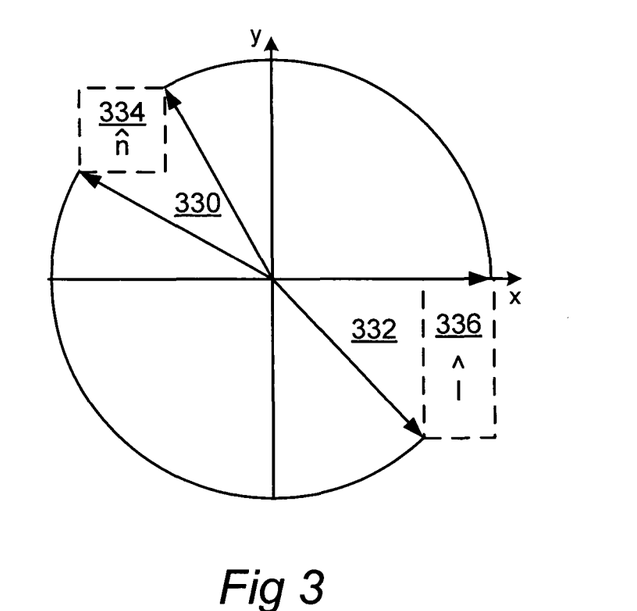
FIG. 3 illustrates an example of where interval arithmetic can be used to cull a tile in the display adapter of FIG. 1.

FIG. 3 illustrates an example of where interval arithmetic can be used to cull a tile in the display adapter 100 of FIG. 1.

For an entire tile of fragments, assume that it is determined that the input interval 334 of its normals 330 is $\hat{n} = ([-\sqrt{3}/2, -1/2], [1/2, \sqrt{3}/2])$, and the interval 336 for its light vector 332 is $\hat{l} = ([1/\sqrt{2}, 1], [-1/\sqrt{2}, 0])$, as illustrated in FIG. 3. The z-coordinates are assumed to be zero, which simplifies this illustratory example. The dot product between these interval representations results in $\hat{d} = \hat{n} \cdot \hat{l} = [-(\sqrt{6}+\sqrt{3})/\sqrt{8}, -1/\sqrt{8}]$ (see the DP3 instruction in Table 1). It can thus be concluded that a can be at most be $\overline{d} = -1/\sqrt{8}$. Since this value is strictly less than zero, in the culling program explained above with reference to in FIG. 2, this whole tile can be culled without executing the fragment program for every fragment, as will be explained in some further detail with reference to FIG. 4a below. This is a source of a performance gain in the present invention.

Figure 4A:
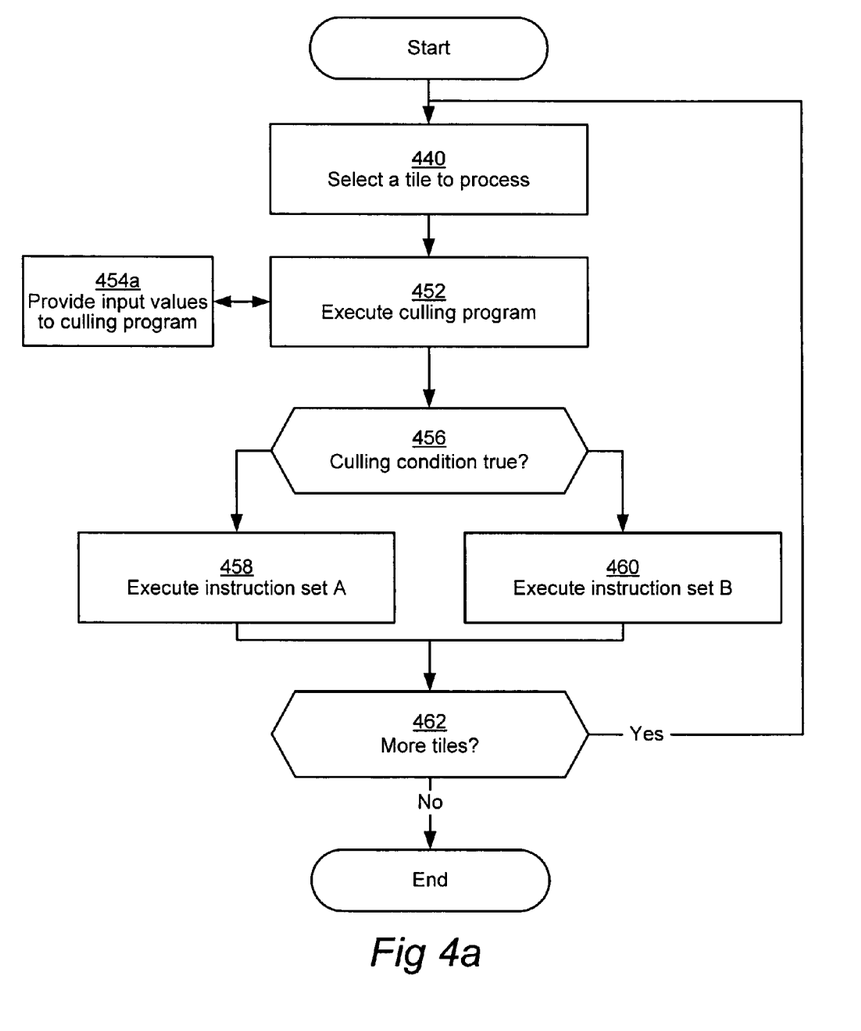
FIGS. 4a and 4b show flow charts for culling processes that can be executed in the display adapter of FIG. 1.

FIG. 4a shows a flow chart for a culling process that can be executed in the display adapter 100 of FIG. 1. When this process starts, a polygon has been selected to be rendered.

In a select a tile to process step 440, a tile is selected, where the selected tile is at least partly overlapped by the polygon.

The culling program is then executed in the execute culling program step 452.

In this embodiment, when the culling program requests input values, the process continues to provide input values to culling program step 454a. The input values are values relating to a characteristic representing all fragments in the tile in some manner. For example, input values could be normals, position coordinates, light vectors, colors, texture coordinates, etc. The requested input values are calculated, in this embodiment, using interval arithmetic. In other words, the input values are only calculated when they are needed, according to a 'pull' mechanism, in contrast to the 'push' mechanism explained with reference to FIG. 4b below. The result of the culling program is whether the currently processed tile should be culled or not. This can be determined strictly, whereby the tile is culled only if the current polygon makes no contribution to the finally rendered image, in the region of the tile. Alternatively, lossy culling can be performed, whereby the tile is culled if a contribution of the current polygon to the finally rendered image falls below a certain threshold value, in the region of the tile.

When the culling program has finished processing, the process continues to a conditional culling condition true step 456. In this step, it is determined whether the culling should be performed for the currently processed tile or not according to the output of the culling program. If culling is to be performed, the process continues to an execute instruction set A step 458. Otherwise, the process continues to an execute instruction set B step 460. In one embodiment, if the culling condition is false, the tile is broken into several smaller tiles and the process returns to the select tile to process step 440. This can be repeated successively for smaller and smaller tiles, implementing a hierarchical, multilevel culling process.

It is to be noted that the culling program may also output other results than a culling condition. These results may be sent down the graphics pipeline for further processing. An example of such an embodiment would comprise reversing the order of the hierarchical depth culling unit 106 (FIG. 1) and the programmable culling unit 108 (FIG. 1). The programmable culling unit computes a bounds or interval of the depth values in a tile, and this interval is sent to the hierarchical depth culling unit. The hierarchical depth culling unit then performs culling based on depth values that are computed by a program.

In the execute instruction set A step 458, an instruction set A is performed for a subset of the tile, typically fragments. The fragments typically collectively cover all pixels of the tile, that overlaps the triangle being processed.

In the execute instruction set B step 460, an instruction set B is performed for a subset of the tile, typically fragments. This is typically a conventional processing of rendering of the fragments after the tile stage.

The instruction set A is typically less demanding than the instruction set B, resulting in a reduced number of instructions processed for the tile when the culling condition is determined to be true, resulting in increased performance. In one embodiment, the instruction set A is empty, leading to a considerable reduction in processing, i.e. increased performance.

Figure 4B:
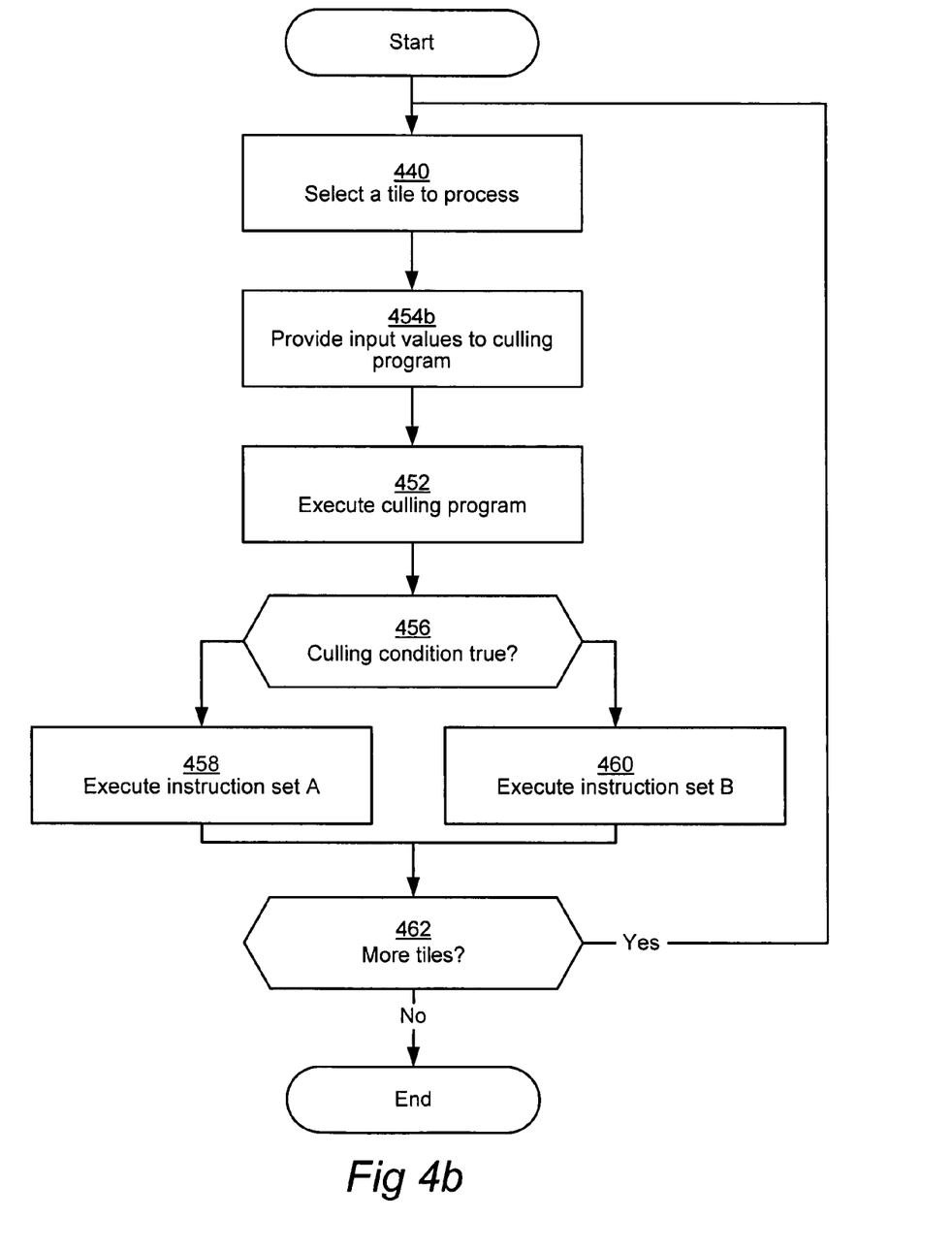

FIG. 4b shows a process essentially equal to the process described with reference to FIG. 4a. The select a tile to process step 440, the execute culling program step 452, the conditional culling condition true step 456, the execute instruction set A step 458, the execute instruction set B step 460 and the conditional more tiles step 462 are all equal to the corresponding steps of FIG. 4a.

However, the provide input values to culling program step 454b is here processed before the culling program is executed. In this step, all relevant input values are calculated, in this embodiment using interval arithmetic, and provided so that the culling program can access these values. This implements a 'push' mechanism for the input value calculation.

FIG. 5 shows an overview architecture of a typical general purpose computer 583 embodying the display adapter 100 of FIG. 1. The computer has a controller 570, such as a CPU, capable of executing software instructions. The controller 570 is connected to a volatile memory 571, such as a random access memory (RAM) and a display adapter 500, 100. The display adapter 500, 100 is in turn connected to a display 576, such as a CRT monitor, an LCD monitor, etc. The controller 570 is also connected to persistent storage 573, such as a hard drive or flash memory and optical storage 574, such as reader and/or writer of optical media such as CD, DVD, HD-DVD or Blu-ray. A network interface 581 is also connected to the controller 570 for providing access to a network 582, such as a local area network, a wide area network (e.g. the Internet), a wireless local area network or wireless metropolitan area network. Through a peripheral interface 577, e.g. interface of type universal serial bus, wireless universal serial bus, firewire, RS232 serial, Centronics parallel, PS/2, the CPU 570 can communicate with a mouse 578, a keyboard 579 or any other peripheral 580, including a joystick, a printer, a scanner, etc.

It is to be noted that although a general purpose computer is described above to embody the invention, the invention can equally well be embodied in any environment where digital graphics, and in particular 3D graphics, is utilized, e.g. game consoles, mobile phones, MP3 players, etc.

Now follows a disclosure how input values may be calculated using interval arithmetic, given an implementation of the instruction set as described above. A culling program can then be executed for a whole tile of fragments. However, in order to do so, bounding intervals for the varying (or interpolated) inputs also need to be computed.

Initially, the value of the varying attribute is computed in all four corners of the tile using interpolation. Then the bounding interval of these four values is computed, and it is called $\hat{a}_c = \lfloor \underline{a}_c, \overline{a}_c \rfloor$. The bounding interval of the varying attribute at the triangle vertices are also computed, and called $\hat{a}_{tri} = \lfloor \underline{a}_{tri}, \overline{a}_{tri} \rfloor$. The final bounding interval of the varying attribute over the tile can be computed as $\hat{a}_{tile} = \lfloor \max(\underline{a}_{tri}, \underline{a}_c), \min(\overline{a}_{tri}, \overline{a}_c) \rfloor$. It is to be noted that there are other ways to compute the intervals, e.g. by considering all fragments overlapping a tile.

Figure 6A:
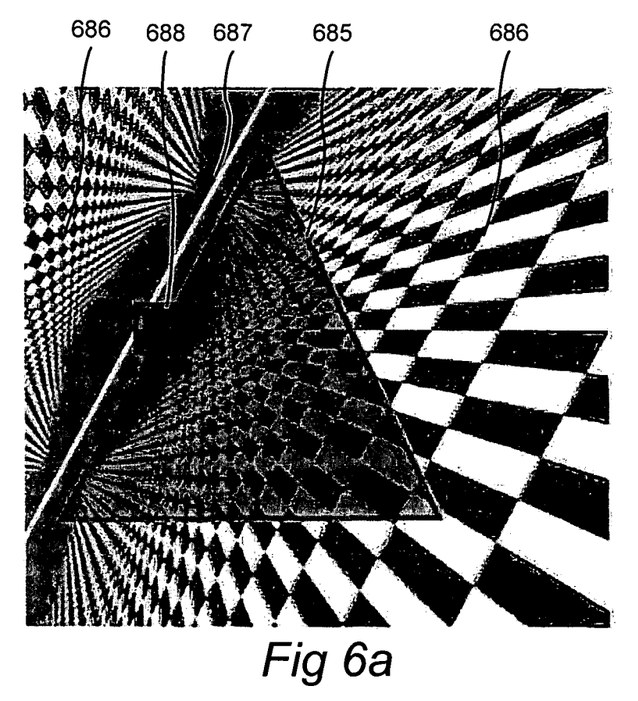
FIG. 6a is a display view illustrating an exceptional case of input values in the display adapter of FIG. 1.

Finally, an exceptional case must be dealt with, which is illustrated in FIG. 6a. Here, perspective correct interpolation over a triangle 685 is illustrated in form of a checkerboard texture 686. As can be seen, the texture is mirrored about a projection line 687, which is the line where the horizon of the triangle 685 would project if it was infinitely large. This mirroring effect is a form of back-projection caused by the division used in perspective correct interpolation. Now, assume that the bounding interval of some varying attribute is desired to be computed over a tile 688, which overlaps the projection line.

Figure 6B:
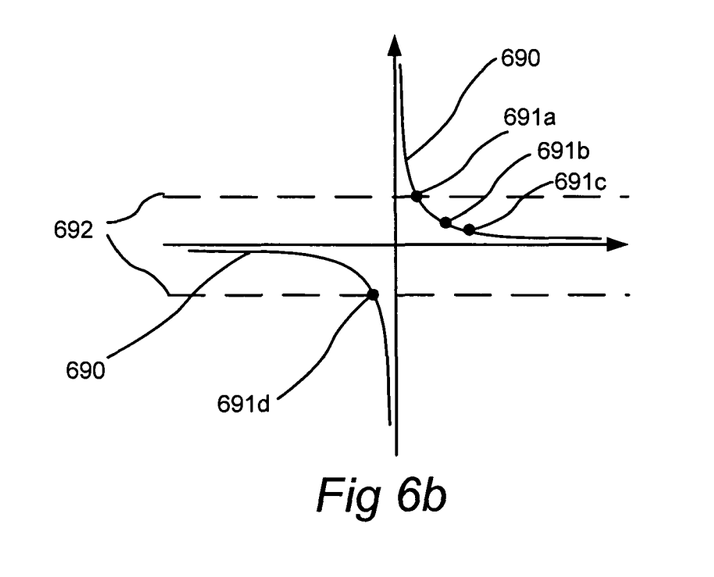

FIG. 6b shows the perspective correct interpolation function 690, as well as the values 691a-d acquired when the four corners of the tile 688 are interpolated. Note that the bounding interval 692 of these corners is clearly incorrect since this does not contain all of the values of the function 690 in this interval, as this function approaches infinity at the projection line.

This exceptional case is dealt with by setting $\hat{a}_{tile}$ to $\hat{a}_{tri}$ as the bounding interval for tiles overlapping the projection line. One might argue that this interval is overly conservative, but these problematic tiles are so rare that it is hard to motivate more complex computations. In this embodiment, only tiles actually overlapping the triangle are traversed, and perspectively correct barycentric coordinates are used to do the interpolation. Barycentric coordinates are disclosed in MCCOOL, M. D., WALES, C., AND MOULE, K. 2002, "Incremental and Hierarchical Hilbert Order Edge Equation Polygon Rasterization", in Graphics Hardware, 65-72.

The problematic tiles can easily be detected when computing perspectively correct barycentric coordinates for the corners of a tile. The perspectively correct barycentric coordinates are expressed as a rational function, and if the denominator is less than zero for any of the tile corners then the tile crosses the projection line.

Here now follows a disclosure of how N-dimensional texture lookups are performed. The interval instructions for performing N-dimensional texture lookups are an improvement over known approaches used for displacement map subdivision. The general idea is to provide a fast and efficient means of computing the bounding interval of the texture data over a given area. The remainder of this example will only consider two-dimensional textures, but generalization is straightforward.

Figure 7A:
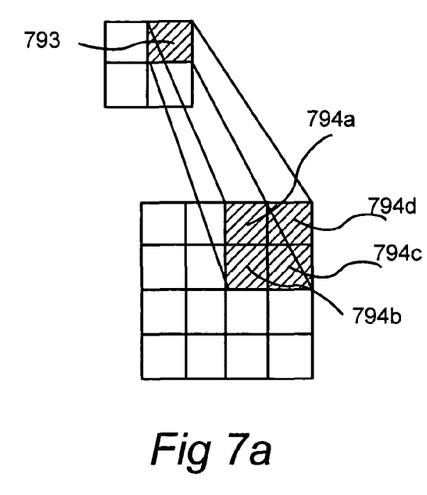
FIGS. 7a and 7b are illustrative perspective views of textures which can be used in the display adapter of FIG. 1.
Figure 7B:
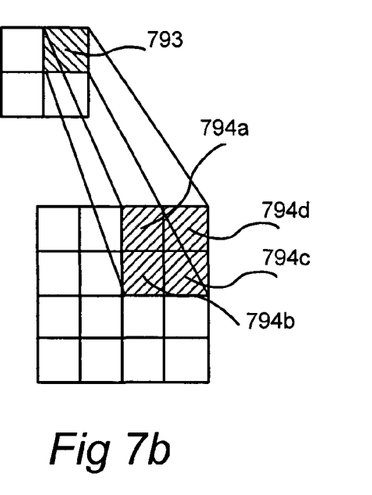
Figure 8A:
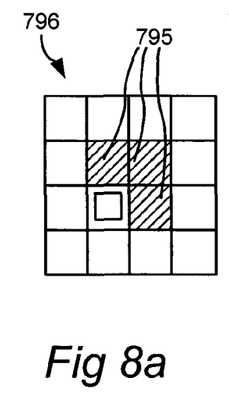
FIGS. 8a-d are illustrative views of textures which can be used in the display adapter of FIG. 1.
Figure 8B:
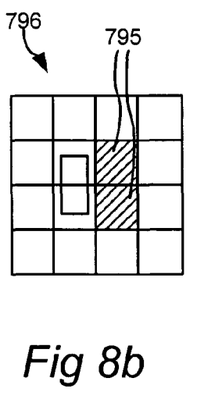
Figure 8C:
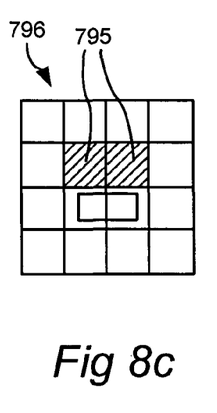
Figure 8D:
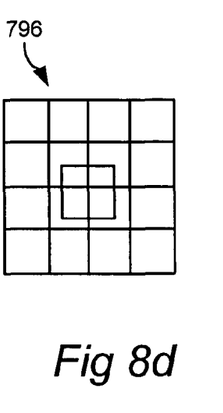

We initially compute two mipmap pyramids for each texture that is subject to interval-based texture lookup. As shown in FIGS. 7a and 7b, each element, e.g. element 793 in a mipmap is computed as the component-wise minimum, as shown in FIG. 7a, or maximum, as shown in FIG. 7b, value of the four corresponding texels, e.g. elements 794a-d, immediately under it in the pyramid. The final result can be seen as a mipmap pyramid of bounding intervals. This type of pre-computation can easily be handled by the driver, similarly to how standard mipmaps are auto-generated.

When performing a texture lookup, we wish to compute the bounding interval of the texture data over an axis-aligned bounding box, which is the texture coordinate interval. First, we compute an appropriate mipmap level as:

$$|\log_2(\max(\overline{t}_x - \underline{t}_x, \overline{t}_t - \underline{t}_y))|$$

where $\hat{t} = (\hat{t}_x, \hat{t}_y)$ is a two-dimensional interval of the unnormalized integer texture coordinates (i.e., they include the dimensions of the texture). These are appropriately rounded such that $\underline{t}_i$ is floored and $\overline{t}_i$ is ceiled for $i \in \{x,y\}$.

When transformed to this mipmap level, $\hat{t}$ will never be more than one texel wide in any dimension, and will be at least ½ texels wide in the widest dimension. Thus, we get four possible cases of texture coordinate intervals as illustrated in FIGS. 8a-d. We always sample a square of 2×2 texels from the texels 796 with the lower left corner at the texel of $(\underline{t}_x, \underline{t}_y)$, in the access scheme used for normal linear interpolation. The result of the texture lookup is then computed as the bounds of the colors of the texels that actually overlap the texture coordinate interval. That is, we discard the texels shaded indicated by reference 795 FIGS. 8a-c. Since the mipmap transformed $\hat{t}$ will be rounded to the nearest integer coordinates, this overlap test can be implemented very efficiently by comparing just the final bit. Our texture lookup process is essentially as costly as a normal "trilinearly" filtered texture lookup. The biggest differences is that we need to be able to sample from the same level in two different mipmap pyramids rather than two adjacent levels, and that we compute the final result as a bounds rather than using linear interpolation. The reader should also note that this strategy natively supports all different kinds of wrapping modes, such as clamp, repeat and mirrored repeat. The appropriate wrapping mode can simply be applied to the interval coordinates, after mipmap level computation, to get the expected result. It can also be shown that this texture lookup process is conservative with respect to filtered texture lookups, as long as the filtered texture lookups compute derivatives using finite differences, and as long as the texture filter does not extend outside the area spanned by the derivatives.

If more texturing units are available, it is possible to improve the bounds of the interval texture lookup. The normal texture lookup assumes that we can read a block of 2×2 texels at a time. If we have enough hardware resources to read a block of 4×4 texels instead, then we can move one level down in the mipmap hierarchy and get a more accurate result.

Another important observation is that we only need to create the mipmap levels that are actually used in the culling program. This optimization is particularly important for algorithms taking place in screen space such as, for instance, order independent transparency. In this case we know beforehand that we only need the texture at its base level, and the mipmap level that corresponds to a tile on the screen. Note that such tile information is already available in modern hardware and can be read "for free". The minimum and maximum depth values can for instance be found in the hierarchical depth culling unit. It is also possible (but less likely) that the min and max colors are already computed for compression purposes, otherwise we need to compute them. Extensions for rendering to the base and tile mipmap level of a texture would greatly accelerate screen space algorithms.

We compute the min/max mipmap pyramid for the cube map, using the same approach as for two-dimensional textures. However, near edges and corners of the cube, special treatment is necessary. For the edges, we compute the mipmap color as the min or max of four texels on both sides of the edge, and for the corners we compute the mipmap color as the min or max of four texels on all three sides emanating from that corner. Texels on opposite sides of edges will therefore share the same colors in higher mipmap levels. Similarly, the three texels in a corner will also share a common color. It should be noted that the highest level mipmap will contain the min and max value over the full cube, as expected.

We can now use this mipmap pyramid to do conservative cube map lookups with accesses to only one side of the cube. First, we compute the interval based equivalent of the major axis. Given a texture coordinate interval $\hat{t}=(\hat{t}_x, \hat{t}_y, \hat{t}_z)$, we define the major axis, i, as the axis where $\underline{t}_i$ and $\overline{t}_i$ have the same sign, and where $\min(|\underline{t}_i|, |\overline{t}_i|)$ is maximized. If $\underline{t}_i$ and $\overline{t}_i$ have different signs over all axes, then we cannot find a major axis. However, this can only happen if the origin lies within the texture coordinate interval. In this case, the texture coordinate interval will project onto the entire cube map. We can easily handle this by choosing the highest mipmap level, and sample an arbitrary cube map face.

Once we have found a major axis, we conservatively project the texture coordinate interval on the corresponding side of the cube map. The projection is done by projecting the bounds of each of the two remaining axes separately. Let us consider an example where x is the major axis and y is the axis for which we want to project the bounds. There are then six possible cases of texture coordinate intervals (note that no interval may cross the y-axis since the x-axis would not be a major axis in that case), and the extreme points we have to project to compute the bounds. Fortunately, it is very easy to determine which these extreme points are. It is sufficient to look at the signs of the texture coordinate interval, and through a table lookup get the extreme points.

We project the extreme points for the remaining two axes to form a two-dimensional projected coordinate interval. This interval is used to compute a mipmap level and perform a two-dimensional texture lookup, identically to the method described in for the two-dimensional case above.

It is possible show that this algorithm is conservative because of the information bleeding during mipmap generation. Furthermore, it is computationally inexpensive. Finding the major axis, and projection can be expected to be twice as costly as a normal cube mapping implementation, which is reasonable considering we use intervals. In addition we need the tabulated function to resolve extreme points based on the signs, but that is already very inexpensive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method comprising:
   receiving a combined pixel shader program having a first set of instructions;
   automatically deriving, by a processor, a culling program having a second set of instructions, and a pixel shader program having the first set of instructions, said second set of instructions being derived from said combined pixel shader program, wherein deriving includes selecting a subset of the first set of instructions in the combined pixel shader program so that the culling program includes less than all of the first set of instructions from the combined pixel shader program and modifying said subset of instructions to use interval arithmetic such that the culling program's second set of instructions consist of the modified instructions;
   while rasterizing a primitive, selecting a first plurality of fragments to process; wherein the processor executes the culling program for the first plurality of fragments; and based on the output of the culling program, selects a first shader program to execute on the first plurality of fragments from a set of shader programs including said pixel shader program; and
   while rasterizing the primitive, selecting a second plurality of fragments to process and repeating the preceding steps for the second plurality of rasterized fragments, including executing the culling program on the second plurality of rasterized fragments, based on the output of the culling program, selecting a second shader program to execute on the second plurality of fragments from a set of shader programs including said pixel shader program.

2. The method of claim 1 including determining an input interval of normals of a tile including said first plurality of rasterized fragments, determining an interval for the light vector of the tile, and taking the dot product of said intervals.

3. The method of claim 1 including using affine arithmetic to derive at least some of the instructions of said culling program.

4. The method of claim 1 including providing values representing at least one attribute of a plurality of fragments to said culling program.

5. The method of claim 1 including said first shader program executing a different number of instructions from said second shader program.

6. The method of claim 3 including executing a selected shader program that includes executing instructions for subsets of a plurality of fragments comprising only one fragment.

7. The method of claim 1, further comprising:
   receiving a second combined pixel shader program having a third set of instructions;
   automatically deriving, by the processor, a second culling program having a fourth set of instructions, and a second pixel shader program having the third set of instructions, said fourth set of instructions being derived from said second combined pixel shader program, wherein deriving includes selecting a second subset of the third set of instructions from the second combined pixel shader program so that the second culling program includes less than all of the third set of instructions from the second combined pixel shader program and modifying said second subset of instructions to use interval arithmetic such that the second culling program's fourth set of instructions consist of the modified instructions;

while rasterizing a second primitive, selecting a third plurality of fragments to process; wherein the processor executes the second culling program for the third plurality of fragments; and based on the output of the second culling program, selects a third shader program to execute on the third plurality of fragments from a second set of shader programs including said second pixel shader program.

8. One or more non-transitory computer readable media storing instructions executable to perform a sequence comprising:

receiving a combined pixel shader program having a first set of instructions;

automatically deriving, by a processor, a culling program having a second set of instructions, and a pixel shader program having the first set of instructions, said second set of instructions being derived from said combined pixel shader program, wherein deriving includes selecting a subset of the first set of instructions in the combined pixel shader program so that the culling program includes less than all of the first set of instructions from the combined pixel shader program and modifying said subset of instructions to use interval arithmetic such that the culling program's second set of instructions consist of the modified instructions;

while rasterizing a primitive, selecting a first plurality of fragments to process; wherein the processor executes the culling program for the first plurality of fragments; and based on the output of the culling program, selects a first shader program to execute on the first plurality of fragments from a set of shader programs including said pixel shader program; and while rasterizing the primitive, selecting a second plurality of fragments to process and repeating the preceding steps for the second plurality of rasterized fragments, including executing the culling program on the second plurality of rasterized fragments, based on the output of the culling program, selecting a second shader program to execute on the second plurality of fragments from a set of shader programs including said pixel shader program.

9. The media of claim 8, said sequence including determining an input interval of normals of a tile including said first plurality of rasterized fragments, determining an interval for the light vector of the tile, and taking the dot product of said intervals.

10. The media of claim 8, said sequence including using affine arithmetic to derive at least some of the instructions of said culling program.

11. The media of claim 8, said sequence including providing values representing at least one attribute of a plurality of fragments to said culling program.

12. The media of claim 10, said sequence including executing a selected shader program that includes executing instructions for subsets of a plurality of fragments comprising only one fragment.

13. The media of claim 8, said sequence including said first shader program executing a different number of instructions from said second shader program.

14. The media of claim 8, said sequence further comprising:

receiving a second combined pixel shader program having a third set of instructions;

automatically deriving, by the processor, a second culling program having a fourth set of instructions, and a second pixel shader program having the third set of instructions, said fourth set of instructions being derived from said second combined pixel shader program, wherein deriving includes selecting a second subset of the third set of instructions from the second combined pixel shader program so that the second culling program includes less than all of the third set of instructions from the second combined pixel shader program and modifying said second subset of instructions to use interval arithmetic such that the second culling program's fourth set of instructions consist of the modified instructions;

while rasterizing a second primitive, selecting a third plurality of fragments to process; wherein the processor executes the second culling program for the third plurality of fragments; and based on the output of the second culling program, selects a third shader program to execute on the third plurality of fragments from a second set of shader programs including said second pixel shader program.

15. An apparatus comprising:

a processor to, receive a combined pixel shader program having a first set of instructions, derive a culling program having a second set of instructions, and a pixel shader program having the first set of instructions, said second set of instructions being derived from said combined pixel shader program, wherein deriving includes selecting a subset of the first set of instructions in the combined pixel shader program so that the culling program includes less than all of the first set of instructions from the combined pixel shader program and modifying said subset of instructions to use interval arithmetic such that the culling program's second set of instructions consist of the modified instructions; while rasterizing a primitive, select a first plurality of fragments to process; execute the culling program for the first plurality of fragments; and based on the output of the culling program, select a first shader program to execute on the first plurality of fragments from a set of shader programs including said pixel shader program; and while rasterizing the primitive, select a second plurality of fragments to process and repeating the preceding for the second plurality of rasterized fragments, including executing the culling program on the second plurality of rasterized fragments, and based on the output of the culling program, selecting a second shader program to execute on the second plurality of fragments from a set of shader programs including said pixel shader program; and a storage coupled to said processor.

16. The apparatus of claim 15, said processor to determine an input interval of normals of a tile including said first plurality of rasterized fragments, determining an interval for the light vector of the tile, and taking the dot product of said intervals.

17. The apparatus of claim 15, said processor to use affine arithmetic to derive at least some of the instructions of said culling program.

18. The apparatus of claim 15, said processor to provide values representing at least one attribute of a plurality of fragments to said culling program.

19. The apparatus of claim 17, said processor to execute a selected shader program that includes executing instructions for subsets of a plurality of fragments comprising only one fragment.

20. The apparatus of claim 15, wherein executing said first shader program includes executing a different number of instructions from executing said second shader program.

21. The apparatus of claim 15, said processor to further receive a second combined pixel shader program having a third set of instructions; derive a second culling program having a fourth set of instructions, and a second pixel shader program having the third set of instructions, said fourth set of instructions being derived from said second combined pixel shader program, wherein deriving includes selecting a second subset of the third set of instructions from the second combined pixel shader program so that the second culling program includes less than all of the third set of instructions from the second combined pixel shader program and modifying said second subset of instructions to use interval arithmetic such that the second culling program's fourth set of instructions consist of the modified instructions; and while rasterizing a second primitive, select a third plurality of fragments to process; execute the second culling program for the third plurality of fragments; and based on the output of the second culling program, select a third shader program to execute on the third plurality of fragments from a second set of shader programs including said second pixel shader program.

* * * * *